US010827293B2

United States Patent
Liao et al.

(10) Patent No.: US 10,827,293 B2
(45) Date of Patent: Nov. 3, 2020

(54) SOUND REPRODUCING METHOD, APPARATUS AND NON-TRANSITORY COMPUTER READABLE STORAGE MEDIUM THEREOF

(71) Applicant: HTC Corporation, Taoyuan (TW)

(72) Inventors: Chun-Min Liao, Taoyuan (TW); Yan-Min Kuo, Taoyuan (TW); Li-Yen Lin, Taoyuan (TW); Chi-Tang Ho, Taoyuan (TW); Tien-Ming Wang, Taoyuan (TW); Tsung-Yu Tsai, Taoyuan (TW); Yen-Chieh Wang, Taoyuan (TW); Shuo-Yen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/159,733

(22) Filed: Oct. 15, 2018

(65) Prior Publication Data

US 2019/0116441 A1    Apr. 18, 2019

Related U.S. Application Data

(60) Provisional application No. 62/573,707, filed on Oct. 18, 2017.

(51) Int. Cl.
*H04S 7/00* (2006.01)
*G02B 27/01* (2006.01)
(Continued)

(52) U.S. Cl.
CPC ............. *H04S 7/30* (2013.01); *G02B 27/017* (2013.01); *G10K 15/02* (2013.01); *G10K 15/04* (2013.01);
(Continued)

(58) Field of Classification Search
CPC ........ H04S 7/30; H04S 7/304; H04S 2400/01; H04S 2420/01; G10K 15/02; G10K 15/04; G02B 27/017
(Continued)

(56) References Cited

U.S. PATENT DOCUMENTS

2010/0080396 A1* 4/2010 Aoyagi .................. H04S 1/005
381/17
2010/0246831 A1* 9/2010 Mahabub ................ H04S 1/002
381/17
(Continued)

FOREIGN PATENT DOCUMENTS

CN          102665156 A      9/2012
WO          2015058503 A1    4/2015

*Primary Examiner* — Vivian C Chin
*Assistant Examiner* — Douglas J Suthers
(74) *Attorney, Agent, or Firm* — CKC & Partners Co., LLC

(57) ABSTRACT

A sound reproducing method used in sound reproducing apparatus that includes the steps outlined below is provided. A sound signal is generated with a 3D sound generating process according to listener data and sound data. Pre-recorded sound data is retrieved to further generate a target distance function corresponding to the sound distance. A fixed head-related transfer function corresponding to a fixed distance is retrieved. A target head-related transfer function corresponding to the sound distance is generated by adapting the target distance function to the fixed head-related transfer function. The sound signal is reproduced by multiplying the sound signal by the target head-related transfer function.

13 Claims, 3 Drawing Sheets

(51) Int. Cl.
*G10K 15/02* (2006.01)
*G10K 15/04* (2006.01)

(52) U.S. Cl.
CPC .......... *H04S 7/304* (2013.01); *H04S 2400/01* (2013.01); *H04S 2420/01* (2013.01)

(58) Field of Classification Search
USPC .......................................................... 381/17
See application file for complete search history.

(56) References Cited

U.S. PATENT DOCUMENTS

2013/0287235 A1* 10/2013 Fukui ...................... H04S 1/005
 381/310
2020/0145776 A1* 5/2020 Herre ...................... G06F 3/012

\* cited by examiner

SOUND REPRODUCING METHOD, APPARATUS AND NON-TRANSITORY COMPUTER READABLE STORAGE MEDIUM THEREOF

RELATED APPLICATIONS

This application claims priority to U.S. Provisional Application Ser. No. 62/573,707, filed Oct. 18, 2017, which is herein incorporated by reference.

BACKGROUND

Field of Disclosure

The present disclosure relates to sound reproducing technology. More particularly, the present disclosure relates to a sound reproducing method, a sound reproducing apparatus and a non-transitory computer readable storage medium thereof.

Description of Related Art

In recent years, virtual reality technology is widely used in the fields such as gaming, engineering and military, etc. In order to experience the virtual reality environment, a user needs to view the displayed frames displaying a virtual environment through the display apparatus disposed at such as, but not limited a head-mounted device (HMD) wear by the user. Further, the user can listen to the sound generated based on the virtual environment by using a sound reproducing apparatus disposed also at the HMD.

As a sound strikes a listener, the size and shape of the head, ears, ear canal, density of the head, size and shape of nasal and oral cavities, all transform the sound and affect how it is perceived, boosting some frequencies and attenuating others. In order to have a better virtual reality experience, the sound perceived by the user should take the factors mentioned above into consideration. However, when all these factors are taken into consideration, the computation amount is too large such that a real-time processing is impossible.

Accordingly, what is needed is a sound reproducing method, a sound reproducing apparatus and a non-transitory computer readable storage medium thereof to address the above issues.

SUMMARY

An aspect of the present disclosure is to provide a sound reproducing method used in sound reproducing apparatus that includes the steps outlined below. A sound signal is generated with a three-dimensional (3D) sound generating process according to listener data and sound data. Pre-recorded sound data that includes a relation between a test sound and different listening distances of the test sound is retrieved to further generate a target distance function corresponding to the sound distance. A fixed head-related transfer function corresponding to a fixed distance is retrieved. A target head-related transfer function corresponding to the sound distance is generated by adapting the target distance function to the fixed head-related transfer function. The sound signal is reproduced by multiplying the target head-related transfer function.

Another aspect of the present disclosure is to provide a sound reproducing apparatus that includes a storage, a sound playback circuit and a processor. The storage is configured to store a plurality of computer-executable instructions. The processor is electrically coupled to the storage and the sound playback circuit and configured to retrieve and execute the computer-executable instructions to perform a sound reproducing method when the computer-executable instructions are executed, wherein the sound reproducing method includes the steps outlined below. A sound signal is generated with a three-dimensional (3D) sound generating process according to listener data and sound data. Pre-recorded sound data that includes a relation between a test sound and different listening distances of the test sound is retrieved to further generate a target distance function corresponding to the sound distance. A fixed head-related transfer function corresponding to a fixed distance is retrieved. A target head-related transfer function corresponding to the sound distance is generated by adapting the target distance function to the fixed head-related transfer function. The sound signal is reproduced by multiplying the target head-related transfer function by the sound playback circuit.

Yet another aspect of the present disclosure is to provide a non-transitory computer readable storage medium that that stores a computer program including a plurality of computer-executable instructions to perform a sound reproducing method used in a sound reproducing apparatus, the sound reproducing apparatus at least includes a storage, a sound playback circuit and a processor electrically coupled to the storage and the sound playback circuit and configured to retrieve and execute the computer-executable instructions to perform the sound reproducing method when the computer-executable instructions are executed. The sound reproducing method includes the steps outlined below. A sound signal is generated with a three-dimensional (3D) sound generating process according to listener data and sound data. Pre-recorded sound data that includes a relation between a test sound and different listening distances of the test sound is retrieved to further generate a target distance function corresponding to the sound distance. A fixed head-related transfer function corresponding to a fixed distance is retrieved. A target head-related transfer function corresponding to the sound distance is generated by adapting the target distance function to the fixed head-related transfer function. The sound signal is reproduced by multiplying the target head-related transfer function by the sound playback circuit.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
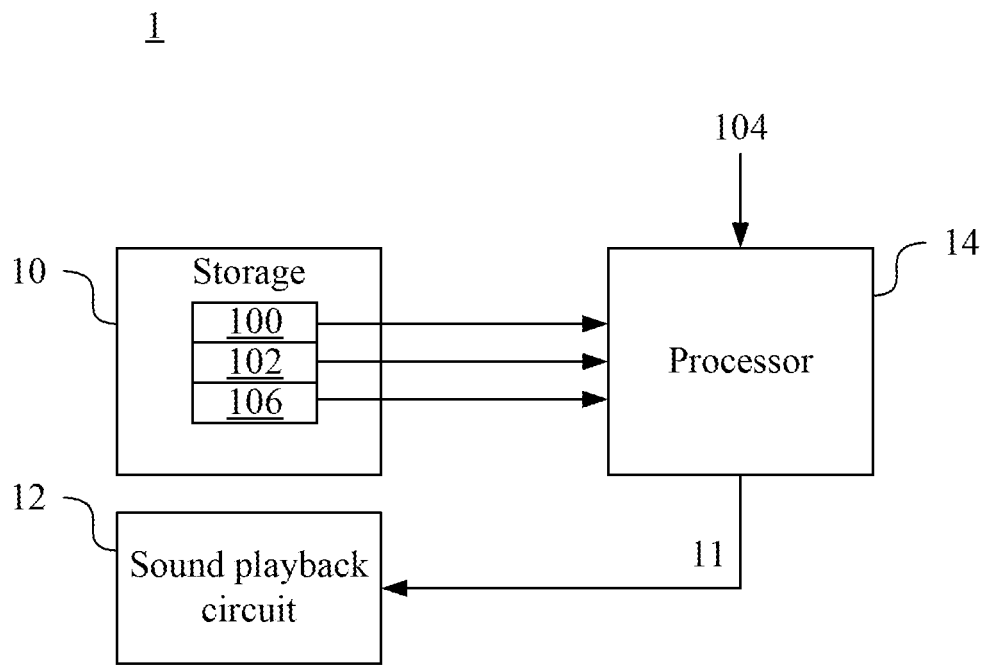
FIG. 1 is a block diagram of a sound reproducing apparatus in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a block diagram of a sound reproducing apparatus 1 in an embodiment of the present invention. In an embodiment, the sound reproducing apparatus 1 is used in a head-mounted device (HMD). More specifically, the components of the sound reproducing apparatus 1 are disposed at various positions of the HMD.

The sound reproducing apparatus 1 includes a storage 10, a sound playback circuit 12 and a processor 14.

In an embodiment, the storage 10 can be such as, but not limited to CD ROM, RAM, ROM, floppy disk, hard disk or optic magnetic disk. The storage 10 is configured to store a plurality of computer-executable instructions 100.

The sound playback circuit 12 is configured to reproduce a sound signal 11 generated by the processor 14. In an embodiment, the sound playback circuit 12 may include a first playback unit and a second playback unit (not illustrated) configured to playback a first channel sound and a second channel sound, in which a user that wears the HMD can put the first playback unit and the second playback unit into or close to the two ears of the user to hear the playback result.

The processor 14 is electrically coupled to the storage 10 and the sound playback circuit 12. In an embodiment, the processor 14 is configured to retrieve and execute the computer-executable instructions 100 to operate the function of the sound reproducing apparatus 1 accordingly.

Figure 2:
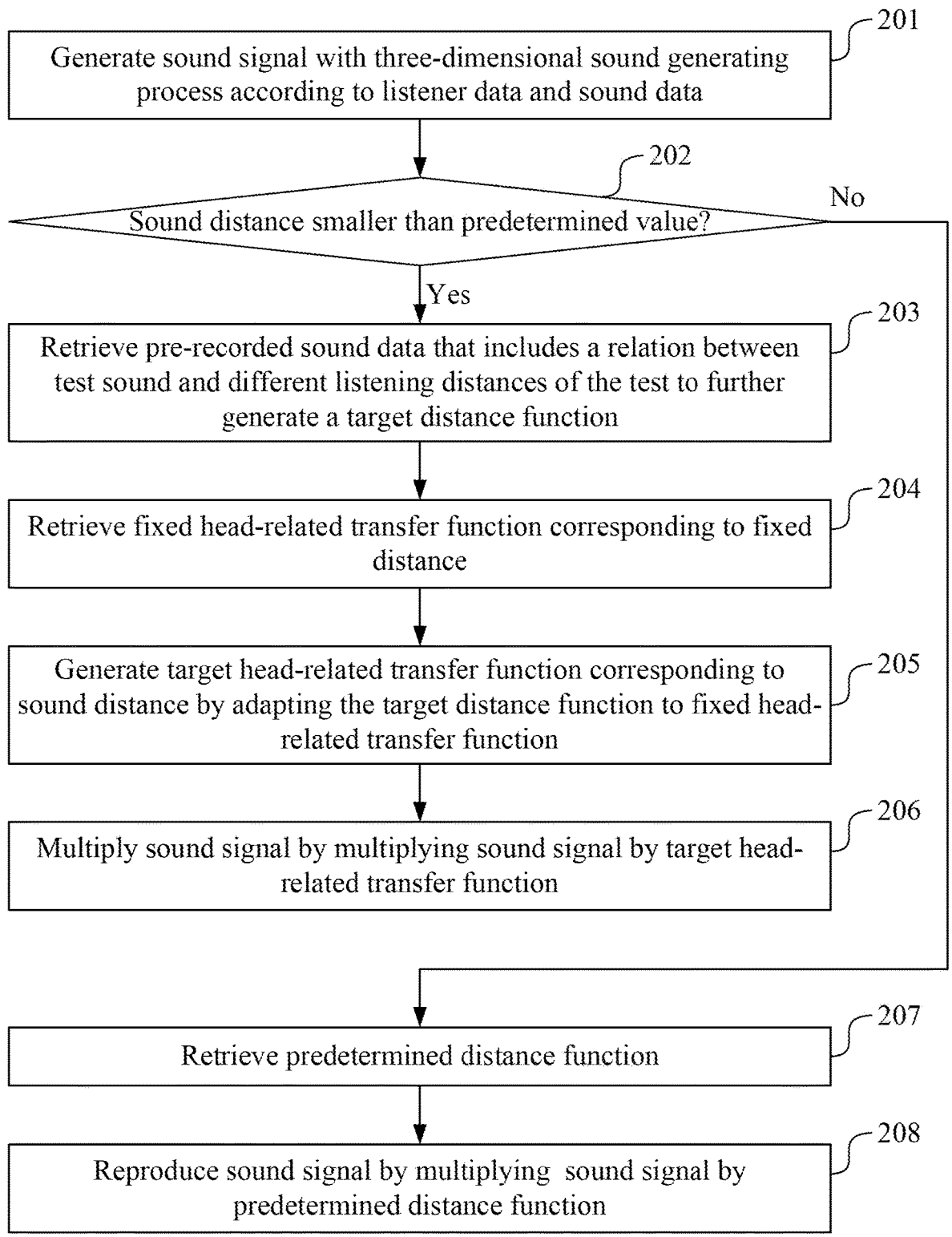
FIG. 2 is a flow chart of a sound reproducing method in an embodiment of the present invention.

Reference is now made to FIG. 2. The detail of the function of the sound reproducing apparatus 1 is described in the following paragraphs in accompany with FIG. 1 and FIG. 2.

FIG. 2 is a flow chart of a sound reproducing method 200 in an embodiment of the present invention. The sound reproducing method 200 can be used in the sound reproducing apparatus 1 illustrated in FIG. 1.

The sound reproducing 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, a sound signal 11 is generated with a three-dimensional (3D) sound generating process according to listener data 102 and sound data 104.

Figure 3:
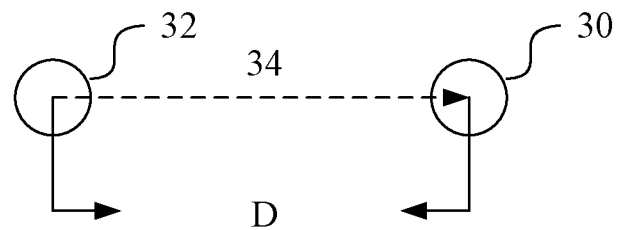
FIG. 3 is a diagram illustrating a listener and a sound source within a virtual environment in an embodiment of the present invention.

Reference is now made to FIG. 3 at the same time. FIG. 3 is a diagram illustrating a listener 30 and a sound source 32 within a virtual environment 3 in an embodiment of the present invention.

In an embodiment, the listener data 102 includes information of a position of the listener 30, i.e. the user of the HMD, in the virtual environment 3. The listener data 102 is stored in the storage 10 and can be updated in a real time manner depending on a process of a simulated scenario such as, but not limited to game or military training. The processor 14 is able to retrieve the listener data 102 from the storage 10.

In an embodiment, the sound data 104 includes information of a position of the sound source 32 that generates a sound 34 in the virtual environment 3 perceived by the user. The sound data 104 can be received through such as, but not limited to a network module (not illustrated) in the sound reproducing apparatus 1 by the processor 14 and can be generated during the process of the simulated scenario.

Based on the listener data 102 and the sound data 104, the processor 14 can obtain the positions of the listener 30 and the sound source 32.

A transmission path of the sound 34 is formed between the sound source 32 and the listener 30. As a result, the sound signal 11 is generated with the three-dimensional sound generating process such that the reproducing of the sound signal 11 results in the sound 34 that is directional and corresponding to the transmission path.

In step 202, whether a sound distance, e.g. the sound distance D illustrated in FIG. 3, between a sound source position and a listener position is smaller than a predetermined value is determined according to the listener data 102 and the sound data 104.

In step 203, when the sound distance D is smaller than the predetermined value, pre-recorded sound data 106 that includes a relation between a test sound and different listening distances of the test sound is retrieved to further generate a target distance function corresponding to the sound distance D.

In an embodiment, the pre-recorded sound data 106 includes the test sound and a pre-recorded listened sound and is stored in the storage 10.

Figure 4A:
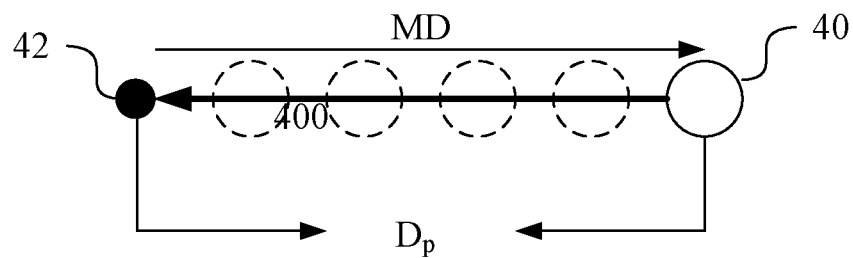
FIG. 4A is a diagram illustrating a sound generator that generates a test sound and a listening spot for receiving the test sound within an actual environment in an embodiment of the present invention.
Figure 4B:
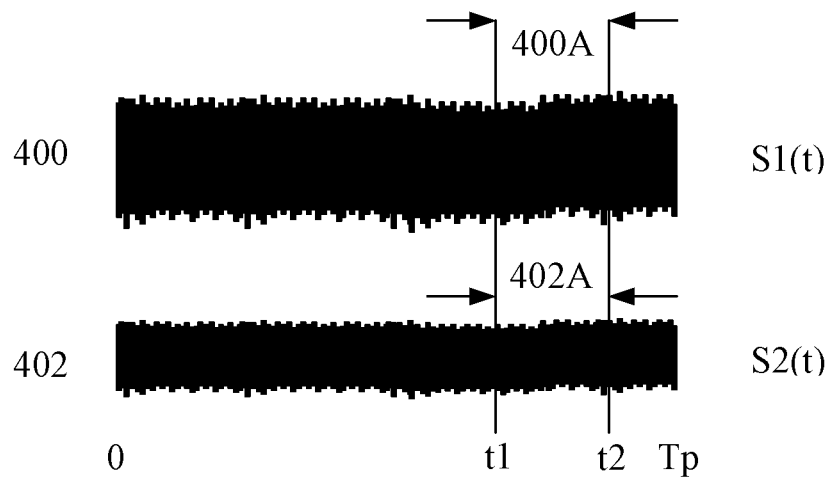
FIG. 4B is an exemplary diagram of the test sound and a pre-recorded listened sound in an embodiment of the present invention.

Reference is now made to FIG. 4A and FIG. 4B. FIG. 4A is a diagram illustrating a sound generator 40 that generates a test sound 400 and a listening spot 42 for receiving the test sound 400 within an actual environment in an embodiment of the present invention. FIG. 4B is an exemplary diagram of the test sound 400 and a pre-recorded listened sound 402 in an embodiment of the present invention.

The sound generator 40 moves in a direction MD such that the sound generator 40 moves away from the listening spot 42 from a location next to the listening spot 42 to a distance Dp corresponding to the predetermined value. In other words, the distance Dp is the largest distance that the sound generator 40 reaches during the recording process. The pre-recorded listened sound 402 is obtained by recording the test sound 400 at the listening spot 42 while the test sound 400 continuously moves away from the listening spot 42 during the recording process. The test sound 400 and the pre-recorded listened sound 402 may be expressed by S1(*t*) and S2(*t*), respectively, where t is a time variable from 0 (at which the distance between the sound generator 40 to the listening spot 42 is 0) to Tp (at which the distance between the sound generator 40 to the listening spot 42 is DP).

As described above, the test sound 400 and the pre-recorded listened sound 402 of the pre-recorded sound data 106 are stored in the storage 10. Based on the sound distance D, a first section 400A of the test sound 400 and a second section 402A of the pre-recorded listened sound 402 are therefore retrieved from the storage 10, in which the first section 400A and the second section 402A correspond to a time that the test sound 400 moves to the distance corresponding to the sound distance D.

Further, by performing operation on the second section 402A and the first section 400A, such as but not limited to dividing the second section 402A by the first section 400A, the target distance function is generated, in which the target distance function stands for the listening effect that occurs to the sound due to the sound distance D. It is supported that each of the first section 400A of the test sound 400 and the second section 402A of the pre-recorded listened sound 402 is from the time t1 to the time t2 (the time interval [t1,t2] corresponds to the sound distance D). If a division operation is performed on the first section 400A of the test sound 400 and the second section 402A of the pre-recorded listened sound 402, then the target distance function at the sound distance D may be expressed by $$TS(D) = TS(t)|_{t=[t1,t2]} = \frac{S2(t)}{S1(t)}\bigg|_{t=[t1,t2]} = \frac{S2(D)}{S1(D)}.$$

In step 204, a fixed head-related transfer function corresponding to a fixed distance is retrieved.

In an embodiment, the fixed head-related transfer function is stored in the storage 10. The head-related transfer function is a response that characterizes how an ear receives a sound from a point in space, in which different head-related transfer functions correspond to different distances of the point that generates the sound. As a result, the fixed head-related transfer function is the response that corresponds to a specific fixed distance.

In step 205, a target head-related transfer function corresponding to the sound distance D is generated by adapting the target distance function to the fixed head-related transfer function.

In an embodiment, a convolution is performed on the fixed head-related transfer function and the target distance function to generate the target head-related transfer function. As a result, though the fixed head-related transfer function is for a fixed distance, the effect of different distances can be simulated based on the target distance function.

In step 206, the sound signal 11 is reproduced by multiplying the sound signal 11 by the target head-related transfer function by the sound playback circuit 12.

When the sound distance D is not smaller than the predetermined value, in step 207, a predetermined distance function is retrieved. Since the pre-recorded sound data 106 only include the data related to the distance smaller than the predetermined value, the predetermined distance function is used.

In an embodiment, the predetermined distance function is also stored in the storage 10 and the predetermined distance function is $1/D^2$, in which the predetermined distance function decreases the amplitude of the sound based on the distance only.

Further, in step 208, the sound signal 11 is reproduced by multiplying the sound signal 11 by the predetermined distance function by the sound playback circuit 12.

As a sound strikes a listener, the size and shape of the head, ears, ear canal, density of the head, size and shape of nasal and oral cavities, all transform the sound and affect how it is perceived, boosting some frequencies and attenuating others. However, when all these factors are taken into consideration, the computation amount is too large such that a real-time processing is impossible.

The sound reproducing apparatus 1 and the sound reproducing method 200 of the present invention can adapt the target distance function corresponding to a required distance to a head-related transfer function corresponding to a fixed distance to simulate the complex conditions of the listening without large amount of computation resource.

It should be noted that, in some embodiments, the sound reproducing method 200 may be implemented as a computer program. When the computer program is executed by a computer, an electronic device, or the processor 14 in FIG. 1, this executing device performs the sound reproducing method 200. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sound reproducing method used in sound reproducing apparatus comprising:
   generating a sound signal with a three-dimensional (3D) sound generating process according to listener data and sound data, wherein the listener data includes a listener position and the sound data includes a sound source position, and a sound distance is defined as between the listener position and the sound source position;
   retrieving a first section of a test sound corresponding to the sound distance;
   retrieving a second section of a pre-recorded listened sound corresponding to the sound distance, wherein the pre-recorded listened sound is obtained by recording the test sound at a listening spot while a playing spot at which the test sound is played continuously moves away from the listening spot to a predetermined distance;
   obtaining a target distance function by dividing the second section of the pre-recorded listened sound by the first section of the test sound;
   generating a target head-related transfer function by performing a convolutional operation on the target distance function and a fixed head-related transfer function that is dependent from a distance variable; and
   reproducing the sound signal by multiplying the sound signal by a value of the target head-related transfer function at the sound distance.

2. The sound reproducing method of claim 1, further comprising:
   determining whether the sound distance is smaller than the predetermined value,
   wherein the first section of the test sound and the second section of the pre-recorded listened sound are retrieved to generate the target distance function if the sound distance is determined to be smaller than the predetermined distance.

3. The sound reproducing method of claim 2, further comprising:
   if the sound distance is determined not to be smaller than the predetermined value:
      retrieving a predetermined distance function that is dependent from a distance variable; and
      reproducing the sound signal by multiplying the sound signal by a value of the predetermined distance function at the sound distance.

4. The sound reproducing method of claim 3, wherein the predetermined distance function is the inverse square of the distance variable.

5. A sound reproducing apparatus comprising:
   a storage configured to store a plurality of computer-executable instructions, listener data;
   a sound playback circuit; and
   a processor electrically coupled to the storage and the sound playback circuit and configured to retrieve and execute the computer-executable instructions to perform the following operations:
      generating a sound signal with a three-dimensional (3D) sound generating process according to the listener data and sound data, wherein the listener data includes a listener position and the sound data includes a sound source position, a sound distance is defined as between the listener position and the sound source position;
      retrieving a first section of a test sound corresponding to the sound distance,
      retrieving a second section of a pre-recorded listened sound corresponding to the sound distance, wherein the pre-recorded listened sound is obtained by recording the test sound at a listening spot while a playing spot at which the test sound is played continuously moves away from the listening spot to a predetermined distance;
      obtaining a target distance function by dividing the second section of the pre-recorded listened sound by the first section of the test sound;
      generating a target head-related transfer function by performing a convolutional operation on the target distance function and a fixed head-related transfer function that is dependent from a distance variable; and
      controlling the sound playback circuit to reproduce the sound signal by multiplying the sound signal by a value of the target head-related transfer function at the sound distance.

6. The sound reproducing apparatus of claim 5, wherein the processor is configured to retrieve and execute the computer-executable instructions to further perform the following operations:
   determining whether the sound distance is smaller than the predetermined; and
   retrieving the first section of the test sound and the second section of the pre-recorded listened sound to generate the target distance function if the sound distance is smaller than the predetermined distance.

7. The sound reproducing apparatus of claim 6, wherein the processor is configured to retrieve and execute the computer-executable instructions to further perform the following operations if the sound distance is determined not to be smaller than the predetermined value:
   retrieving a predetermined distance function that is dependent from a distance variable; and
   controlling the sound playback circuit to reproduce the sound signal by multiplying the sound signal by a value of the predetermined distance function at the sound distance.

8. The sound reproducing apparatus of claim 7, wherein the predetermined distance function is the inverse square of the distance variable.

9. The sound reproducing apparatus of claim 5, wherein the test sound and the pre-recorded listened sound are prestored in the storage.

10. A non-transitory computer readable storage medium that stores a computer program comprising a plurality of computer-executable instructions that, when executed by a processor, cause the processor to perform the following operations:
    generating a sound signal with a three-dimensional (3D) sound generating process according to listener data and sound data, wherein the listener data includes a listener position and the sound data includes a sound source position, a sound distance is defined as between the listener position and the sound source position;

retrieving a first section of a test sound corresponding to the sound distance;

retrieving a second section of a pre-recorded listened sound corresponding to the sound distanced, wherein the pre-recorded listened sound is obtained by recording the test sound at a listening spot while a playing spot at which the test sound is played continuously moves away from the listening spot to a predetermined distance;

obtaining a target distance function by dividing the second section of the pre-recorded listened sound by the first section of the test sound;

generating a target head-related transfer function by performing a convolutional operation on the target distance function and a fixed head-related transfer function that is dependent from a distance variable; and reproducing the sound signal by multiplying the sound signal by a value of the target head-related transfer function at the sound distance.

11. The non-transitory computer readable storage medium of claim 10, wherein execution of the computer-executable instructions cause the processor to further perform the following operations:

determining whether the sound distance is smaller than the predetermined distance, retrieving the first section of the test sound and the second section of the pre-recorded listened sound to generate the target distance function if the sound distance is determined to be smaller than the predetermined distance.

12. The non-transitory computer readable storage medium of claim 11, wherein execution of the computer-executable instructions cause the processor to further perform the following operations if the sound distance is determined not to be smaller than the predetermined value:

retrieving a predetermined distance function that is dependent from a distance variable; and reproducing the sound signal by multiplying the sound signal by a value of the predetermined distance function at the sound distance.

13. The non-transitory computer readable storage medium of claim 12, wherein the predetermined distance function is the inverse square of the distance variable.

* * * * *